(12) United States Patent　　　　(10) Patent No.:　US 12,596,483 B2
Suto　　　　　　　　　　　　　　　(45) Date of Patent:　Apr. 7, 2026

(54) INFORMATION PROCESSING SYSTEM AND INFORMATION PROCESSING METHOD

(71) Applicant: Panasonic Automotive Systems Co., Ltd., Kanagawa (JP)

(72) Inventor: Masato Suto, Hiroshima (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/987,300

(22) Filed: Dec. 19, 2024

(65) Prior Publication Data

US 2025/0208763 A1　　Jun. 26, 2025

(30) Foreign Application Priority Data

Dec. 26, 2023　(JP) ................................. 2023-219340

(51) Int. Cl.
　G06F 3/06　　　　　(2006.01)
(52) U.S. Cl.
　CPC .......... G06F 3/0616 (2013.01); G06F 3/0659 (2013.01); G06F 3/0679 (2013.01)
(58) Field of Classification Search
　None
　See application file for complete search history.

(56) References Cited

U.S. PATENT DOCUMENTS

| | | | | |
|---|---|---|---|---|
| 10,810,054 | B1 * | 10/2020 | Martinez Lerin | ....... G06F 3/067 |
| 2011/0016271 | A1 * | 1/2011 | Ash | ..................... G06F 12/0866 |
| | | | | 711/E12.019 |
| 2017/0052715 | A1 | 2/2017 | Suzuki | |
| 2018/0300242 | A1 * | 10/2018 | Liu | ......................... G06F 16/00 |
| 2022/0236882 | A1 | 7/2022 | Koseki et al. | |

FOREIGN PATENT DOCUMENTS

| | | | |
|---|---|---|---|
| JP | 6116119 | B2 | 4/2017 |
| JP | 6273907 | B2 | 2/2018 |
| JP | 6403130 | B2 | 10/2018 |
| JP | 2022-114643 | A | 8/2022 |

* cited by examiner

*Primary Examiner* — Brian R Peugh
(74) *Attorney, Agent, or Firm* — GREENBLUM & BERNSTEIN, P.L.C.

(57) ABSTRACT

An information processing system includes: an application adder that obtain an estimated writing amount that is estimated to be written to a non-volatile memory by an application per unit time; and the application adder, a monitor, and a controller that suppress writing to the non-volatile memory by the application based on the estimated writing amount.

12 Claims, 10 Drawing Sheets

FIG. 3

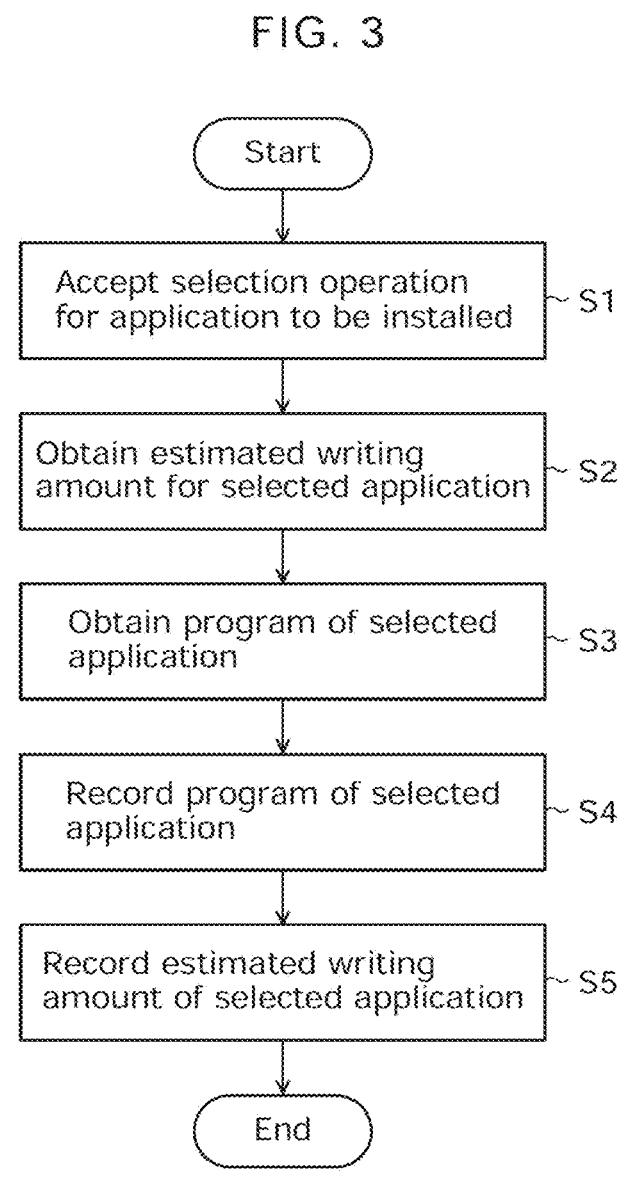

```
        ┌─────────┐
        │  Start  │
        └─────────┘
             │
             ▼
┌───────────────────────────┐
│ Accept selection operation │ ～ S1
│ for application to be installed │
└───────────────────────────┘
             │
             ▼
┌───────────────────────────┐
│ Obtain estimated writing   │ ～ S2
│ amount for selected application │
└───────────────────────────┘
             │
             ▼
┌───────────────────────────┐
│ Obtain program of selected │ ～ S3
│ application                │
└───────────────────────────┘
             │
             ▼
┌───────────────────────────┐
│ Record program of selected │ ～ S4
│ application                │
└───────────────────────────┘
             │
             ▼
┌───────────────────────────┐
│ Record estimated writing   │ ～ S5
│ amount of selected application │
└───────────────────────────┘
             │
             ▼
        ┌─────────┐
        │   End   │
        └─────────┘
```

INFORMATION PROCESSING SYSTEM AND INFORMATION PROCESSING METHOD

CROSS REFERENCE TO RELATED APPLICATION

The present application is based on and claims priority of Japanese Patent Application No. 2023-219340 filed on Dec. 26, 2023.

FIELD

The present disclosure relates to an information processing system and the like.

BACKGROUND

Patent Literature (PTL) 1 discloses a recording medium lifespan monitoring system that includes a counter that counts the number of writing to a recording medium, a calculator that calculates the change over time of the number of writing counted by the counter, a predictor that calculates an expected reaching time until the number of writing reaches a limit number of writing in which the writing to the recording medium is limited based on the change over time calculated by the calculator, and a transmitter that transmits the expected reaching time to a management device only when the expected reaching time calculated by the predictor is less than or equal to a set time.

CITATION LIST

Patent Literature

PTL 1: Japanese Patent No. 6116119

SUMMARY

However, the recording medium lifespan monitoring system according to PTL 1 can be improved upon.

In view of this, the present disclosure provides an information processing system and the like capable of improving upon the above related art.

An information processing system according to one aspect of the present disclosure includes: an obtainer that obtains an estimated writing amount that is an estimated amount of data to be written to a non-volatile memory by an application per unit time, and a suppressor that suppresses writing to the non-volatile memory by the application based on the estimated writing amount.

In addition, an information processing method according to one aspect of the present disclosure includes: an obtaining step of obtaining an estimated writing amount that is an estimated amount of data to be written to a non-volatile memory by an application per unit time; and a suppressing step of suppressing writing to the non-volatile memory by the application based on the estimated writing amount.

In addition, a program according to one aspect of the present disclosure is a program for causing a computer to execute the information processing method described above.

It should be noted that these comprehensive or specific aspects may be realized by a system, a method, an integrated circuit, a computer program, or a computer-readable recording medium such as a CD-ROM, or may be realized by any combination of a system, a method, an integrated circuit, a computer program, and a recording medium. In addition, the recording medium may be a non-transitory recording medium.

The information processing system and the like according to one aspect of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a flowchart showing a first operation example in the first information processing method.

DESCRIPTION OF EMBODIMENT

Figure 1:
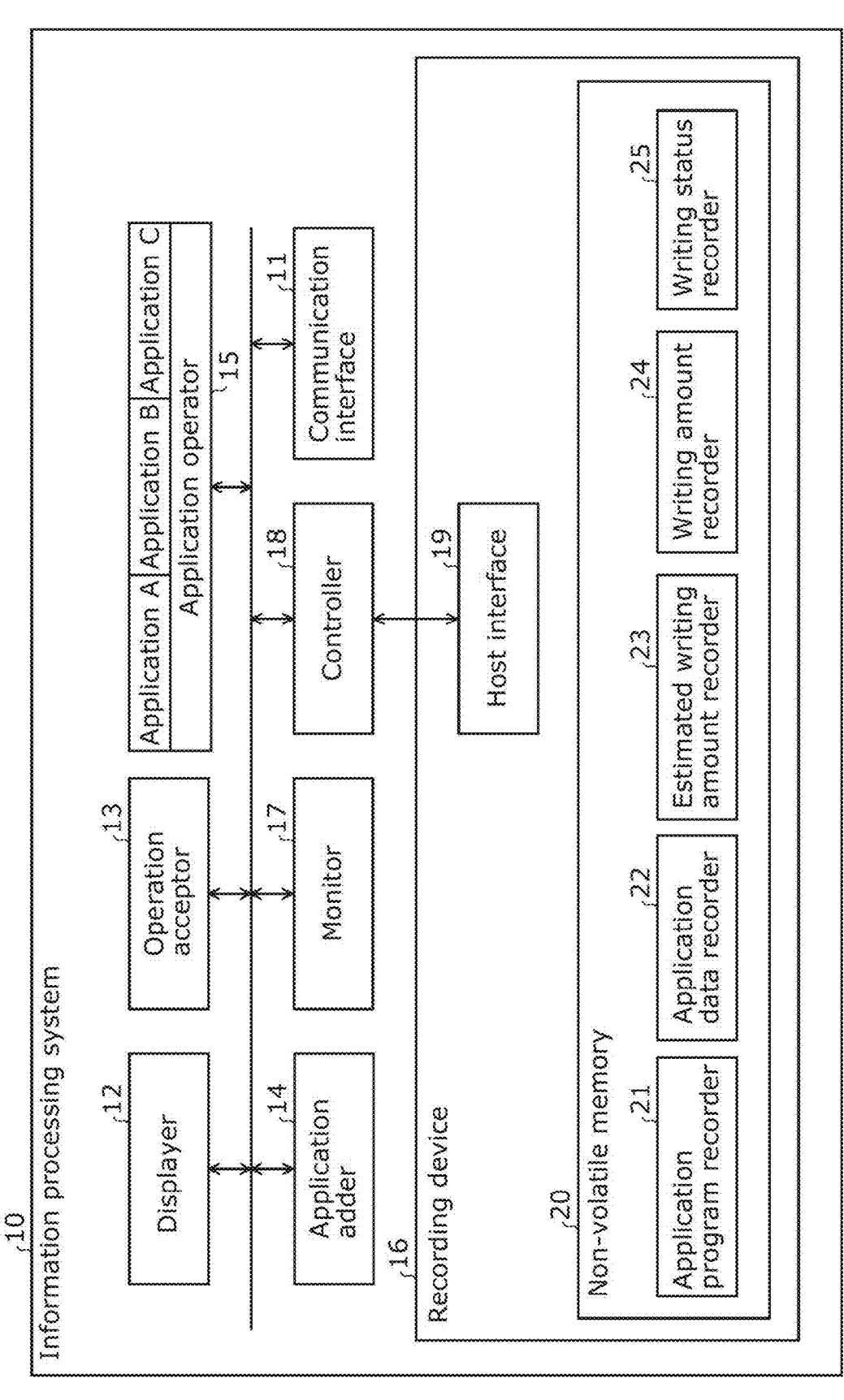
FIG. 1 is a block diagram showing the functional configuration of an information processing system according to an embodiment.

Underlying Knowledge Forming Basis of the Present Disclosure

The present inventor has discovered that the following problems arise with the recording medium lifespan monitoring system of PTL 1, described in the "Background" section.

In the recording medium lifespan monitoring system in PTL 1, it is possible to detect when a recording medium is reaching the end of its lifespan and issue an alarm or the like to prompt the user to replace the recording medium, but there is an issue in that it cannot prevent writing to the recording medium, and therefore cannot prevent the lifespan of the recording medium from being shortened. For this reason, in cases where replacement is difficult, such as devices where the non-volatile memory (recording medium) is difficult to remove, the non-volatile memory may reach the end of its lifespan, causing corruption of recorded data or the like.

Therefore, an information processing system according to one aspect of the present disclosure includes: an obtainer that obtains an estimated writing amount that is an estimated amount of data to be written to a non-volatile memory by an application per unit time, and a suppressor that suppresses writing to the non-volatile memory by the application based on the estimated writing amount.

This makes it possible to suppress writing to non-volatile memory by the application based on the estimated writing amount. Since writing can be suppressed before the non-volatile memory approaches the end of its lifespan, it is possible to prevent the lifespan of the non-volatile memory from being shortened.

In addition, in an information processing system according to one aspect of the present disclosure, the obtainer obtains the estimated writing amount when the application is installed in the information processing system.

According to this, when the application is installed in the information processing system, the estimated writing amount can be reliably obtained, so that writing to non-volatile memory by the application based on the estimated writing amount can be reliably prevented, thereby preventing the lifespan of the non-volatile memory from being shortened.

In addition, in an information processing system according to one aspect of the present disclosure, when a writing amount that is an amount of data written to the non-volatile memory by the application per unit time is greater than the estimated writing amount, the suppressor may suppress the writing.

According to this, it is possible to suppress the shortened lifespan of the non-volatile memory when the writing amount is greater than the estimated writing amount.

In addition, in an information processing system according to one aspect of the present disclosure, the suppressor may suppress the writing by prohibiting the writing.

According to this, it is possible to prohibit the application from writing to non-volatile memory, so that it is possible to suppress the shortened lifespan of non-volatile memory more reliably.

In addition, the information processing system according to one embodiment of the present disclosure may include an outputter that outputs a warning when the writing amount is greater than the estimated writing amount.

According to this, by informing the user and the like that the writing amount is greater than the estimated writing amount, it is possible for the user to be prompted to change the operation of the application to a state in which the writing amount is reduced, and it is possible to suppress the shortened lifespan of the non-volatile memory.

In addition, the information processing system according to one aspect of the present disclosure may include a notifier that notifies the application that writing is being suppressed while the writing is being suppressed.

This allows the application to receive notification and change to a state in which the writing amount is reduced, making it easier to reduce the writing amount to non-volatile memory, so that it is possible to suppress the shortened lifespan of the non-volatile memory more reliably.

In addition, in an information processing system according to one aspect of the present disclosure, the suppressor calculates an estimated lifespan of the non-volatile memory from the estimated writing amount, and when the estimated lifespan is shorter than a target lifespan of the non-volatile memory, the processor may suppress the writing by prohibiting the application from being installed in the information processing system.

According to this, if the estimated lifespan of the non-volatile memory is shorter than the target lifespan, the installation of the application in the information processing system can be prohibited, so that it is possible to suppress the shortened lifespan of the non-volatile memory more reliably.

In addition, the information processing system according to one embodiment of the present disclosure may include an outputter that outputs a list of one or more applications that are not prohibited from being installed among the plurality of applications including the application.

According to this, it is possible to inform the user or the like of one or more applications that are not prohibited from being installed. This makes it possible to suppress complicated installation operations caused by failed attempts to install applications that are prohibited from being installed.

In addition, in an information processing system according to one aspect of the present disclosure, when the writing amount that is an amount of data written to the non-volatile memory per unit time by the installed application is greater than the estimated writing amount, the suppressor may issue, to the installed application, a request for a reduction in the writing amount to the non-volatile memory.

This allows the application to receive notification and change to a state in which the writing amount is reduced, making it easier to reduce the writing amount to non-volatile memory, so that it is possible to further reliably suppress the shortened lifespan of the non-volatile memory. For example, in the case of an application that records videos and the like, it is possible to reduce the writing amount while minimizing the impact on users or the like by lowering the recording quality of the videos.

In addition, in an information processing system according to one aspect of the present disclosure, the suppressor may suppress writing when the writing amount is greater than the estimated writing amount and the request for the reduction has been issued.

This makes it possible to reliably suppress the shortened lifespan of the non-volatile memory, even when even when a request for a reduction in the writing amount has been issued to the application, but the application has not sufficiently reduced the writing amount.

In addition, in an information processing system according to one aspect of the present disclosure, when the writing amount is greater than the estimated writing amount and the request for the reduction has been issued, the suppressor may uninstall the application from the information processing system.

This makes it possible to reliably suppress the shortened lifespan of the non-volatile memory if the writing amount is greater than the estimated writing amount and the request for the reduction in the writing amount has already been issued. In addition, since uninstallation deletes the application from the non-volatile memory, the free space in the non-volatile memory increases, making it possible to further reliably suppress the shortened lifespan of the non-volatile memory.

In addition, an information processing method according to one aspect of the present disclosure includes: an obtaining step for obtaining an estimated writing amount that is an estimated amount of data to be written to a non-volatile memory by an application per unit time; and a suppressing step for suppressing writing to the non-volatile memory by the application based on the estimated writing amount.

This provides the same working effects as the information processing system described above.

In addition, a program according to one aspect of the present disclosure is a program for causing a computer to execute the information processing method described above.

This provides the same working effects as the information processing system described above.

Hereinafter, the embodiments will be described in detail with reference to the drawings.

It should be noted that the embodiments described below are all comprehensive or specific examples. The numerical values, shapes, materials, components, the arrangement and connection forms of the components, steps, and the order of steps shown in the following embodiments are merely examples and are not intended to limit the present disclosure. In addition, among the components in the following embodiments, components that are not described in the independent claims are described as arbitrary components. In addition, each figure is a schematic diagram and is not necessarily exactly illustrated. In addition, in each figure, the same components are given the same reference numerals.

Embodiment

FIG. 1 is a block diagram showing the functional configuration of information processing system 10 according to an embodiment. The functional configuration of information processing system 10 will be described with reference to FIG. 1.

As shown in FIG. 1, information processing system 10 includes communication interface 11, displayer 12, operation acceptor 13, application adder 14, application operator 15, recording device 16, monitor 17, and controller 18. For example, displayer 12 includes a display or the like, operation acceptor 13 includes a touch panel, hardware buttons, or the like, and application adder 14, application operator 15, monitor 17, and controller 18 include a processor and the like.

Communication interface 11 communicates with a server (not shown) or the like that provides an application. Communication interface 11 may perform wireless communication or wired communication.

Displayer 12 is an example of an outputter that outputs a warning when a writing amount that is an amount of data written per unit time to non-volatile memory 20 by an application is greater than the estimated writing amount that is an estimated amount of data to be written per unit time to non-volatile memory 20 by the application. Displayer 12 outputs the warning by displaying the warning. It should be noted that the warning may be output by emitting an alarm sound, or the like. The writing amount and the estimated writing amount will be described later.

Displayer 12 is an example of an outputter that outputs a list of one or more applications that are not prohibited from being installed in information processing system 10. For example, application adder 14 determines whether to prohibit each of a plurality of applications that can be provided by a server or the like that provides applications from being installed in information processing system 10, and displayer 12 outputs a list of one or more applications among the plurality of applications that are not prohibited from being installed in information processing system 10. Displayer 12 outputs the list by displaying the list. It should be noted that displayer 12 may also display a list of a plurality of applications that can be provided by a server or the like that provides applications.

Operation acceptor 13 accepts a selection operation or the like for selecting an application to be installed in information processing system 10. A user or the like can select an application to be installed in information processing system 10 by performing a selection operation.

Application adder 14 adds an application by installing the application in information processing system 10. In addition, when adding an application, application adder 14 obtains an estimated writing amount that is an estimated amount of data to be written by the application to non-volatile memory 20 per unit time and records it in estimated writing amount recorder 23. For example, the estimated writing amount is the amount of data that is estimated to be written by the application to non-volatile memory 20 per unit time, and is expressed as 1 gigabyte/day or the like. For example, the estimated writing amount is estimated by the application developer and the like, information indicating the estimated writing amount is linked to the application, and application adder 14 obtains the estimated writing amount from a server or the like that provides the application. For example, the application and the estimated writing amount are obtained from a server that provides the application connected via communication interface 11.

Application adder 14 calculates the estimated lifespan of non-volatile memory 20 from the estimated writing amount, and when the estimated lifespan is shorter than the target lifespan of non-volatile memory 20, application adder 14 suppresses writing by prohibiting the installation of the application in non-volatile memory 20. For example, the estimated lifespan is calculated as a value obtained by dividing the remaining writable amount of non-volatile memory 20 by the estimated writing amount. The remaining writable amount is the writing amount until non-volatile memory 20 reaches the end of its writing lifespan, and is, for example, a value obtained by subtracting the writing amount up to that point from total bytes written (TBW), which is the total writing amount in non-volatile memory 20.

Application adder 14 is an example of an obtainer that obtains an estimated writing amount that is an estimated amount of data to be written by an application to non-volatile memory 20 per unit time. In addition, application adder 14 is an example of a suppressor that suppresses writing by an application to non-volatile memory 20 based on the estimated writing amount.

Application operator 15 operates the installed applications. Here, application A, application B, and application C are installed, and application operator 15 operates application A, application B, and application C.

Recording device 16 includes host interface 19 and non-volatile memory 20. For example, recording device 16 is a solid state drive (SSD) or the like.

Host interface 19 communicates with controller 18, and communicates with monitor 17 and the like via controller 18. Host interface 19 may perform wireless communication or wired communication.

Non-volatile memory 20 is a non-volatile recording medium with a writing lifespan, which includes application program recorder 21, application data recorder 22, estimated writing amount recorder 23, writing amount recorder 24, and writing status recorder 25. For example, non-volatile memory 20 is a NAND type flash memory or the like.

Application program recorder 21 records the programs of applications installed in information processing system 10. Here, application program recorder 21 stores an application A program, an application B program, and an application C program.

Application data recorder 22 records data related to applications. For example, operation acceptor 13 accepts an input operation by a user, application operator 15 operates an application based on the input operation, and the application records data in application data recorder 22.

Estimated writing amount recorder 23 records the estimated writing amount that is estimated to be written per unit time to non-volatile memory 20 by the application.

Writing amount recorder 24 records a writing amount that is an amount of data written per unit time by an application to non-volatile memory 20. It should be noted that the writing amount is the amount of data written per unit time by an application to non-volatile memory 20.

Writing status recorder 25 records whether writing is suppressed or not. If controller 18 is suppressing writing, writing status recorder 25 records that writing is suppressed, and if controller 18 is not suppressing writing, writing status recorder 25 records that writing is not suppressed.

Monitor 17 monitors the writing amount that is the amount of data written per unit time to non-volatile memory 20 by an application, and makes decisions such as suppressing or prohibiting writing, and the like. If the writing amount that is the amount of data written per unit time to non-volatile memory by an application is greater than the estimated writing amount, monitor 17 suppresses writing. For example, monitor 17 suppresses writing by prohibiting writing.

If the writing amount that is the amount of data written to non-volatile memory 20 by the installed application is greater than the estimated writing amount, monitor 17 issues, to the installed application, a request for a reduction in the amount of data written to non-volatile memory 20. For example, monitor 17 issues, to the installed application, a request for a reduction in the frequency of writing and/or the writing amount of data.

For example, if the writing amount is greater than the estimated writing amount and the request for the reduction has been issued, monitor 17 suppresses writing. For example, monitor 17 suppresses writing by prohibiting writing.

In addition, if the writing amount is greater than the estimated writing amount and the request for the reduction has been issued, monitor 17 uninstalls the application from information processing system 10.

Controller 18 is an example of a notifier that notifies an application that writing is being suppressed while the writing is being suppressed. By controller 18 notifying an application that writing is being suppressed while the writing is being suppressed, the application stops writing, reduces the frequency of writing, or reduces the amount of data written.

Controller 18 controls writing to and reading from recording device 16. In accordance with the determination by monitor 17 to suppress or prohibit writing, controller 18 suppresses or prohibits writing from an application to recording device 16. It should be noted that controller 18 may suppress writing by compressing the written data, or the like.

Monitor 17 and controller 18 are an example of a suppressor that suppresses writing to non-volatile memory 20 by an application based on the estimated writing amount. That is, in the present embodiment, the suppressor includes application adder 14, monitor 17, and controller 18.

Figure 2:
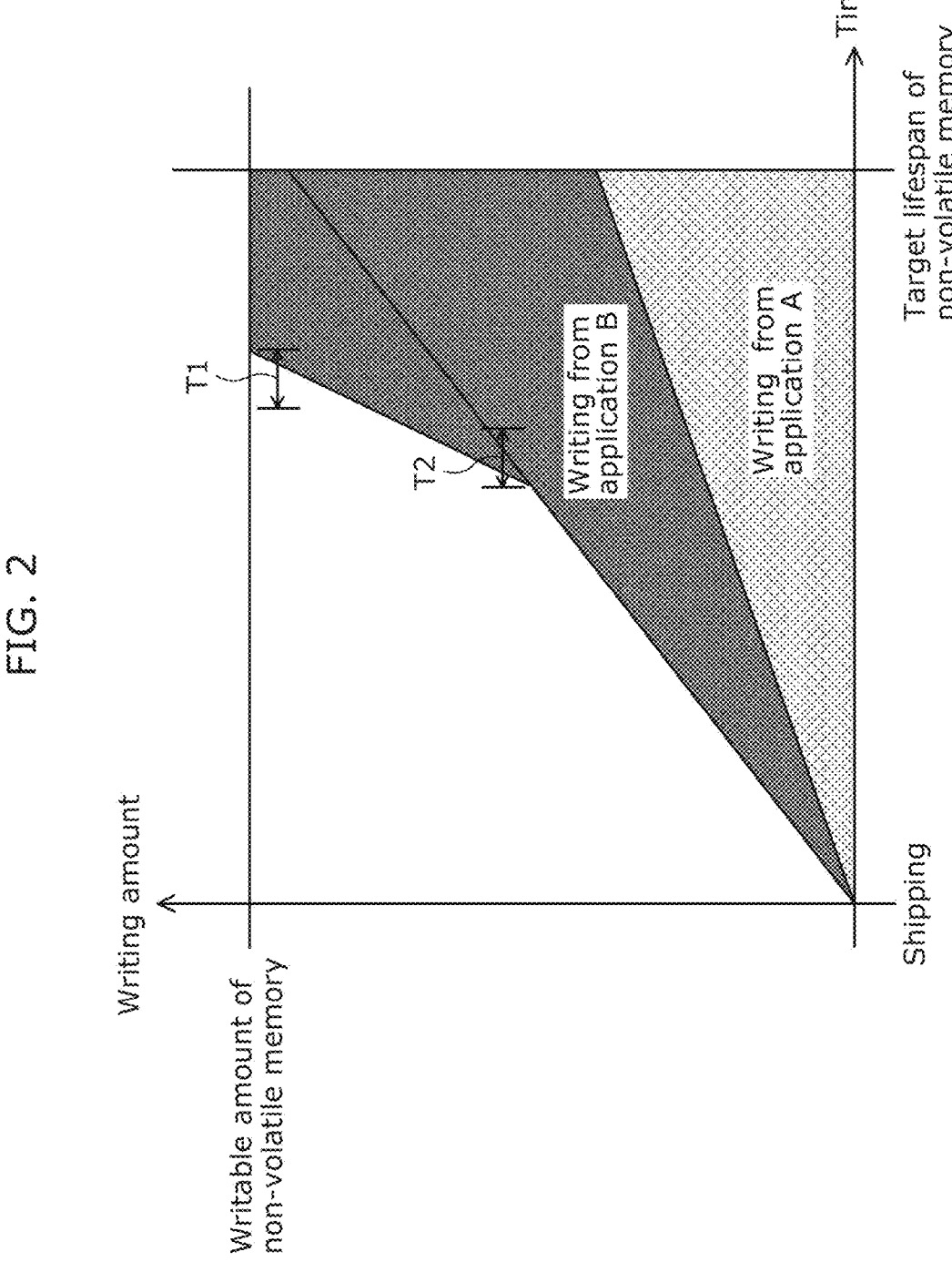
FIG. 2 is a graph for explaining the working effect of the first information processing method by the information processing system of FIG. 1.

FIG. 2 is a graph for explaining the working effect of the first information processing method by information processing system 10 in FIG. 1. The working effect of the first information processing method by information processing system 10 will be described with reference to FIG. 2.

As shown in FIG. 2, the information processing system of the comparative example detects that the writing amount to the non-volatile memory is about to reach the writable amount in period T1 immediately therebefore. On the other hand, information processing system 10 can detect that the writing amount is greater than the estimated writing amount in period T2 before period T1, when the writing amount has become greater than the estimated writing amount, and when the writing amount is greater than the estimated writing amount, information processing system 10 can suppress writing. When the writing amount reaches the writable amount, the life of non-volatile memory 20 comes to an end. The first information processing method will be described below.

FIG. 3 is a flowchart showing a first operation example in the first information processing method. The first operation example in the first information processing method will be described with reference to FIG. 3.

As shown in FIG. 3, operation acceptor 13 accepts a selection operation of an application to be installed (step S1). Here, application adder 14 does not prohibit the installation of an application in non-volatile memory 20 when the estimated lifespan of non-volatile memory 20 is shorter than the target lifespan. For example, when a user or the like accesses a predetermined web page using information processing system 10, a server or the like providing the application causes a selection screen for selecting an application to be displayed on displayer 12. The user or the like selects the application to be installed from the selection screen by performing a selection operation.

Application adder 14 obtains the estimated writing amount of the selected application (obtaining step) (step S2). For example, application adder 14 obtains the estimated writing amount from a server or the like that provides the application.

Application adder 14 obtains the program of the selected application (step S3). For example, application adder 14 obtains the program from a server or the like that provides the application.

Application adder 14 records the program of the selected application in application program recorder 21 (step S4). For example, application adder 14 records a program obtained from a server or the like that provides an application in application program recorder 21.

Application adder 14 records the estimated writing amount of the selected application in estimated writing amount recorder 23 (step S5). For example, application adder 14 records the estimated writing amount obtained from a server or the like that provides the application in estimated writing amount recorder 23.

For example, information processing system 10 performs the first operation example shown in FIG. 3 each time an application is selected by a user or the like.

Figure 4:
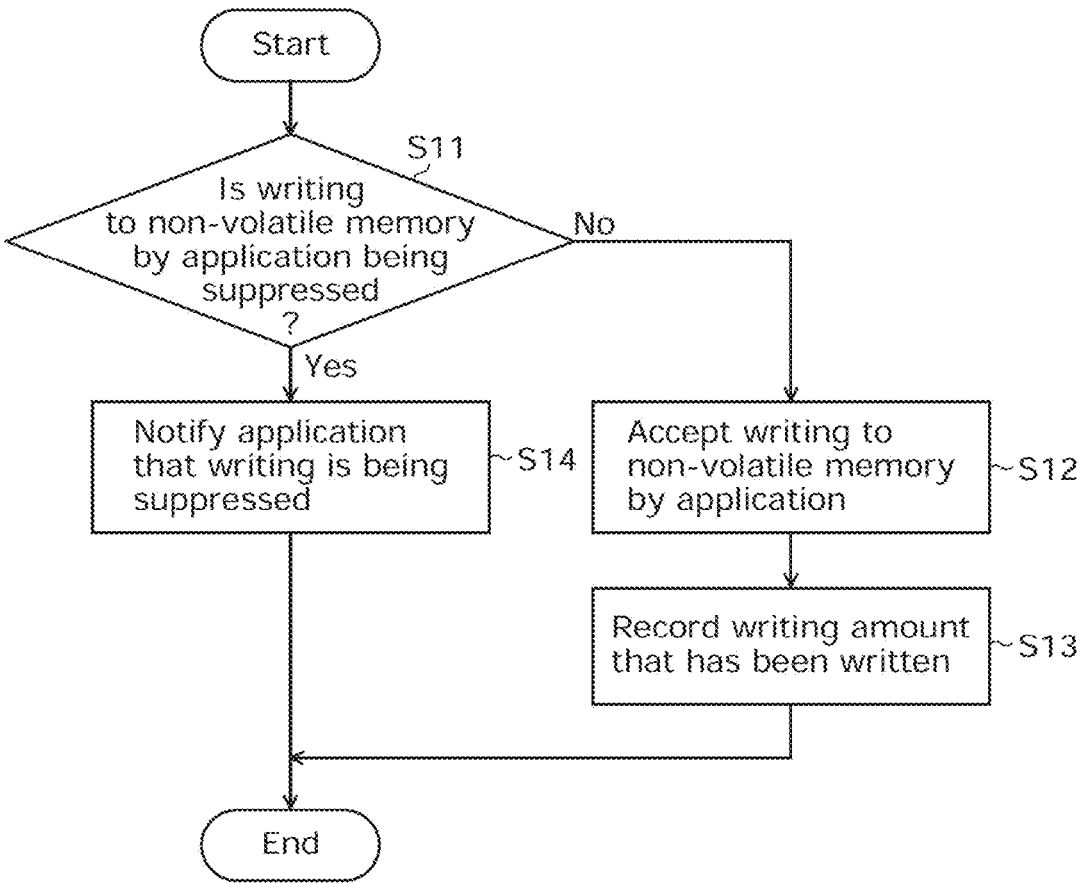
FIG. 4 is a flowchart showing a second operation example in the first information processing method.

FIG. 4 is a flowchart showing a second operation example in the first information processing method. The second operation example in the first information processing method will be described with reference to FIG. 4.

As shown in FIG. 4, controller 18 determines whether writing to non-volatile memory 20 by an application is being suppressed (step S11). Based on the state recorded in writing state recorder 25, controller 18 determines whether writing to non-volatile memory 20 by an application is being suppressed.

If writing to non-volatile memory 20 by the application is not being suppressed (No in step S11), controller 18 accepts writing to non-volatile memory 20 by the application (step S12), and controller 18 records the writing amount that is the amount of data written in writing amount recorder 24 (step S13).

If writing to non-volatile memory 20 by an application is currently being suppressed (Yes in step S11), controller 18 notifies the application that writing is currently suppressed (step S14).

For example, when an application attempts to write to non-volatile memory 20, information processing system 10 performs the second operation example shown in FIG. 4.

Figure 5:
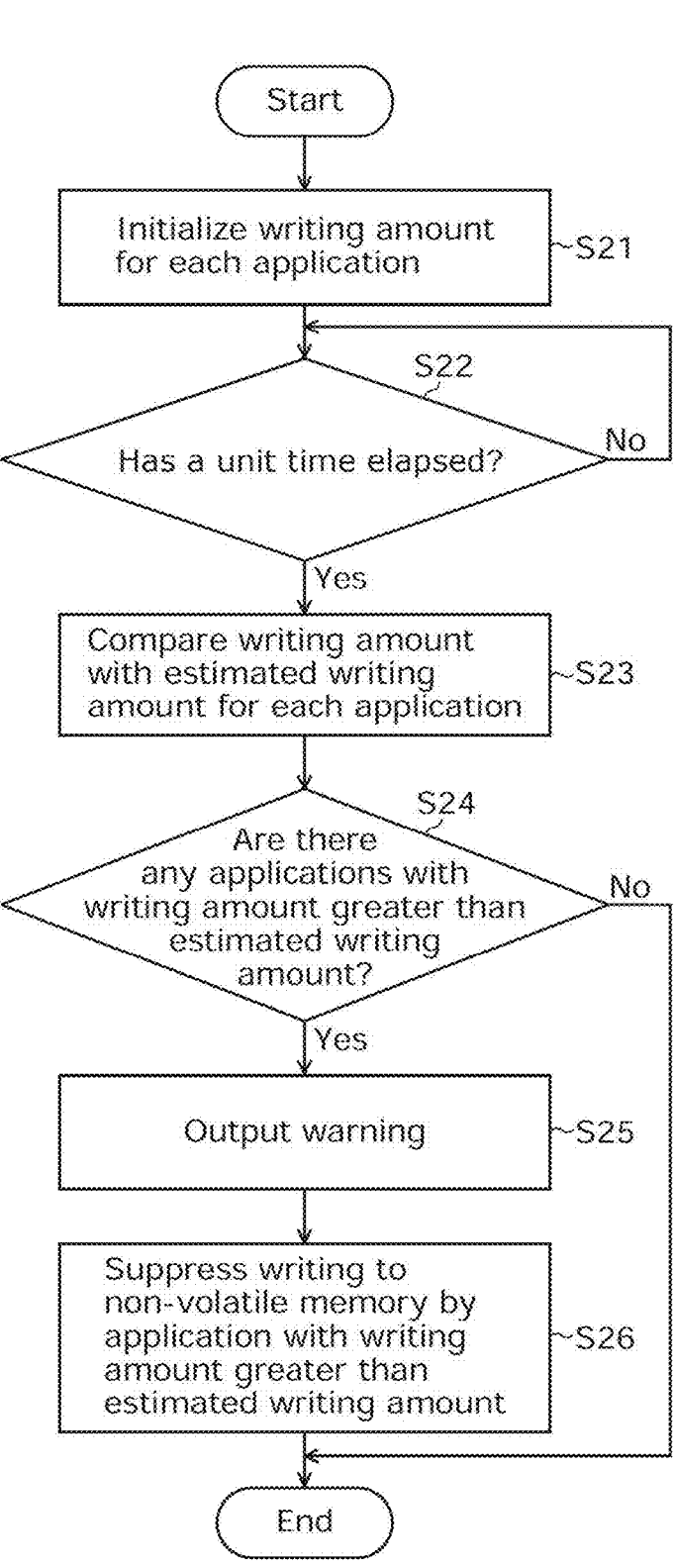
FIG. 5 is a flowchart showing a third operation example in the first information processing method.

FIG. 5 is a flowchart showing a third operation example in the first information processing method. The third operation example in the first information processing method will be described with reference to FIG. 5.

As shown in FIG. 5, monitor 17 initializes the writing amount for each application (step S21).

Monitor 17 determines whether a unit time has elapsed (step S22).

If the unit time has not elapsed (No in step S22), monitor 17 again determines whether the unit time has elapsed (step S22).

When a unit time has elapsed (Yes in step S22), monitor 17 compares the writing amount with the estimated writing amount for each application (step S23). For example, when the writing is performed a plurality of times within a unit time, monitor 17 sums up the writing amounts for the plurality of times and compares the summed writing amount with the estimated writing amount.

Monitor 17 determines whether there are any applications with the writing amount greater than the estimated writing amount (step S24).

If there is no application with writing amount greater than the estimated writing amount (No in step S24), monitor 17 terminates the processing.

If there is an application with writing amount greater than the estimated writing amount (Yes in step S24), displayer 12 outputs a warning (step S25).

Monitor 17 suppresses writing to non-volatile memory 20 by an application with the writing amount greater than the estimated writing amount (suppressing step), and records in writing status recorder 25 that the application will be in a state where writing to non-volatile memory 20 is suppressed (step S26).

For example, information processing system 10 performs the third operation example shown in FIG. 5 every unit time.

In addition, after recording in writing status recorder 25 in step S26 that the application with the writing amount greater than the estimated writing amount will be in a state where writing is suppressed, if the operation of the application is changed in response to a warning or the like output in step S25 and the writing amount from the application to non-volatile memory 20 is reduced, monitor 17 may record in writing status recorder 25 that the application with the reduced writing amount will be in a state where writing is not suppressed and stop the writing suppression. This is effective because the operation of the application is no longer hindered by the writing suppression and the shortened lifespan of non-volatile memory 20 can also be suppressed.

Figure 6:
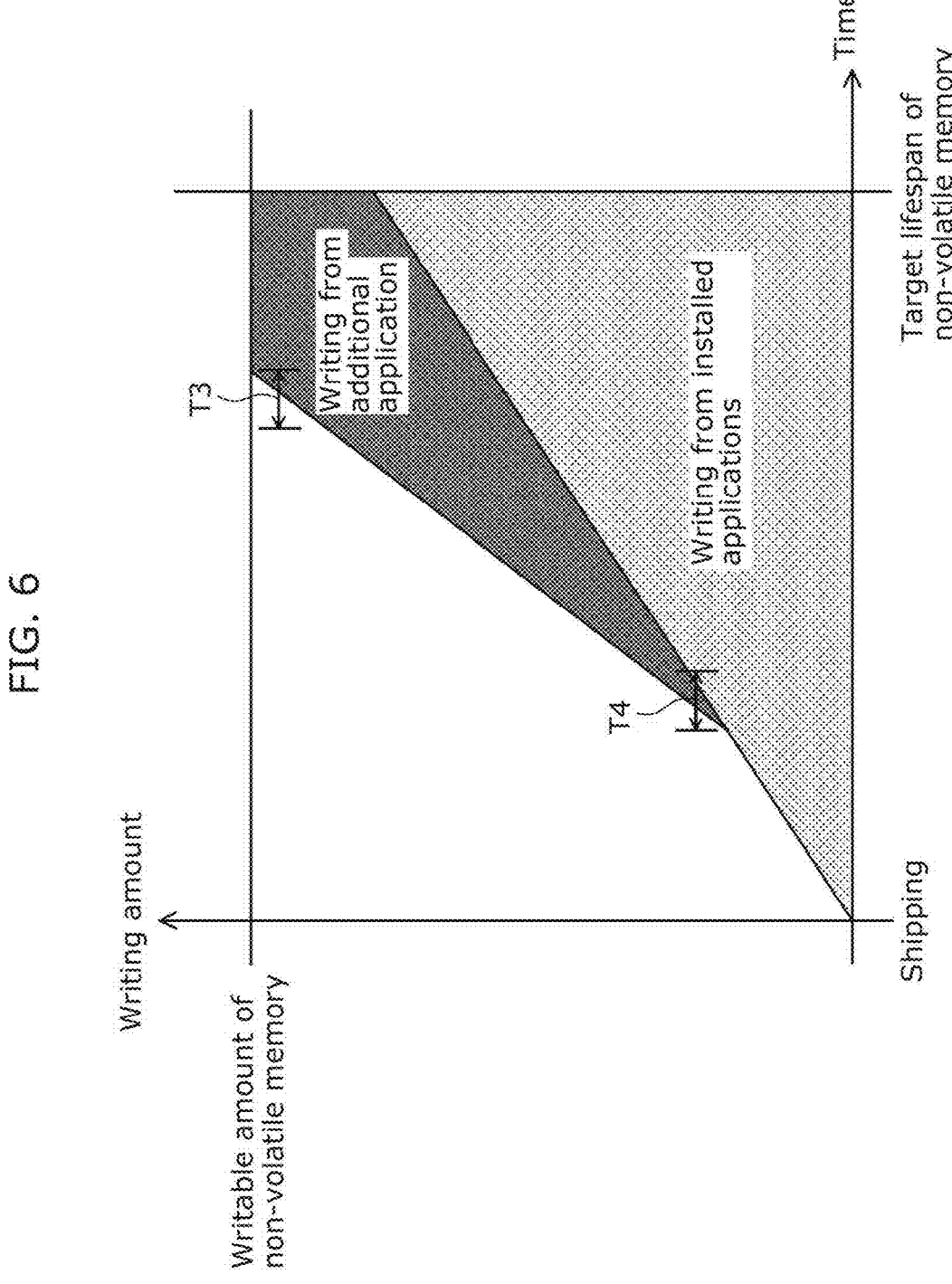
FIG. 6 is a graph for explaining the working effect of the second information processing method by the information processing system of FIG. 1.

FIG. 6 is a graph for explaining the working effect of the second information processing method by information processing system 10 of FIG. 1. The working effect of the second information processing method by information processing system 10 of FIG. 1 will be described with reference to FIG. 6.

As shown in FIG. 6, the information processing system according to the comparative example detects that the writing amount to the non-volatile memory is about to reach the writable amount in period T3 immediately therebefore. On the other hand, information processing system 10 can detect that the estimated lifespan of non-volatile memory 20 will be shorter than the target lifespan in period T4 which is before period T3 and before the application is installed in information processing system 10, and can suppress writing by prohibiting the installation of the application in information processing system 10 when the estimated lifespan of non-volatile memory 20 is shorter than the target lifespan. The second information processing method will be described below.

Figure 7:
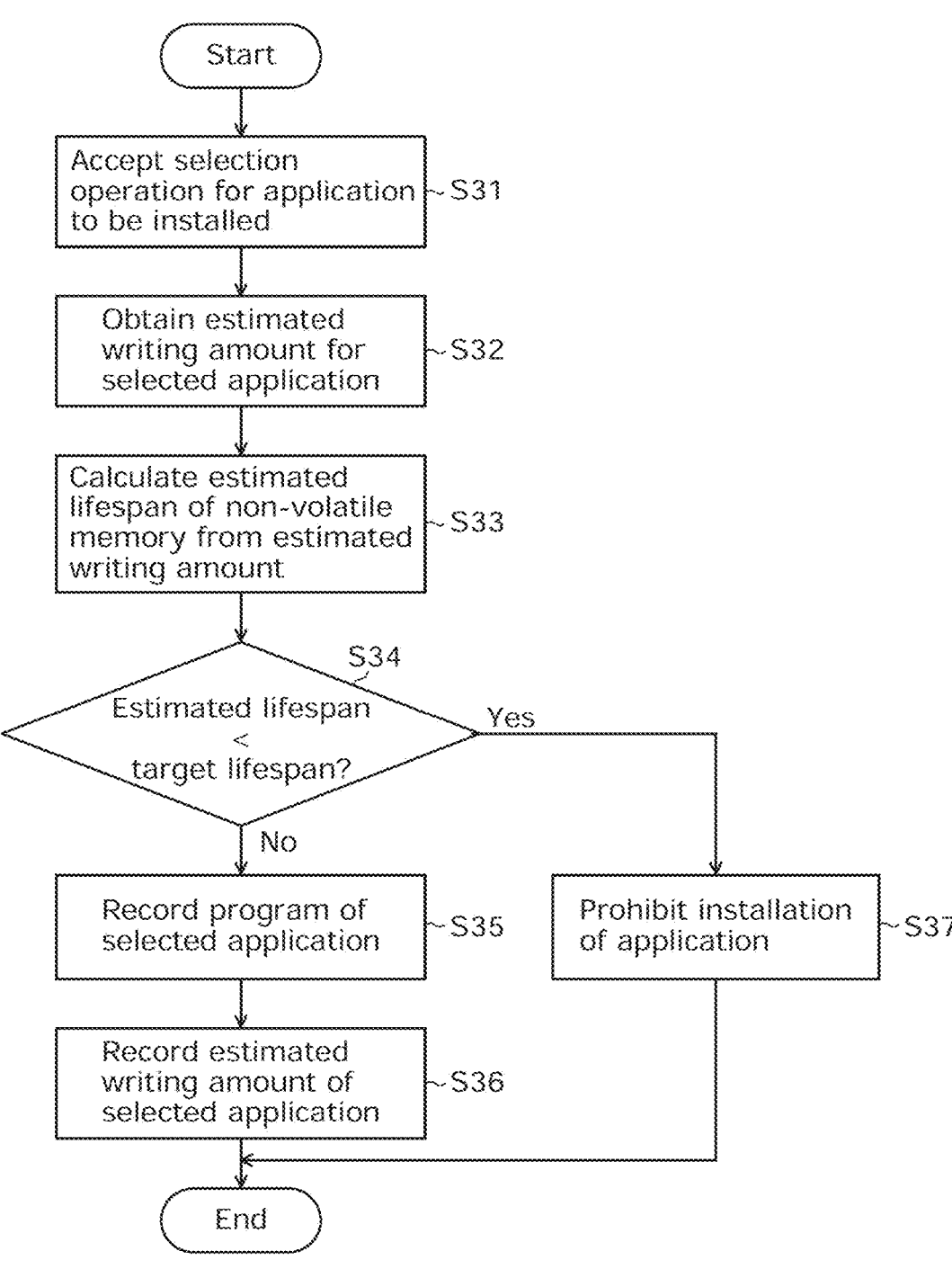
FIG. 7 is a flowchart showing a first operation example in the second information processing method.

FIG. 7 is a flowchart showing a first operation example in the second information processing method. The first operation example in the second information processing method will be described with reference to FIG. 7.

As shown in FIG. 7, operation acceptor 13 accepts a selection operation for an application to be installed (step S31). For example, when a user or the like accesses a predetermined web page using information processing system 10, a server or the like providing the application causes displayer 12 to display a selection screen for selecting the application to be installed. The user or the like selects the application to be installed from the selection screen by performing the selection operation.

Application adder 14 obtains the estimated writing amount of the selected application (obtaining step) (step S32). For example, application adder 14 obtains the estimated writing amount from a server or the like that provides the application.

Application adder 14 calculates the estimated lifespan of non-volatile memory 20 from the estimated writing amount for the selected application (step S33).

Application adder 14 determines whether the estimated lifespan is shorter than the target lifespan (step S34).

If the estimated lifespan is not shorter than the target lifespan (No in step S34), application adder 14 records the program of the selected application in application program recorder 21 (step S35), and records the estimated writing amount of the selected application in estimated writing amount recorder 23 (step S36).

If the estimated lifespan is shorter than the target lifespan (Yes in step S34), application adder 14 prohibits installation of the application (suppressing step) (step S37).

For example, information processing system 10 performs the first operation example shown in FIG. 7 each time an application is selected by a user or the like.

Figure 8:
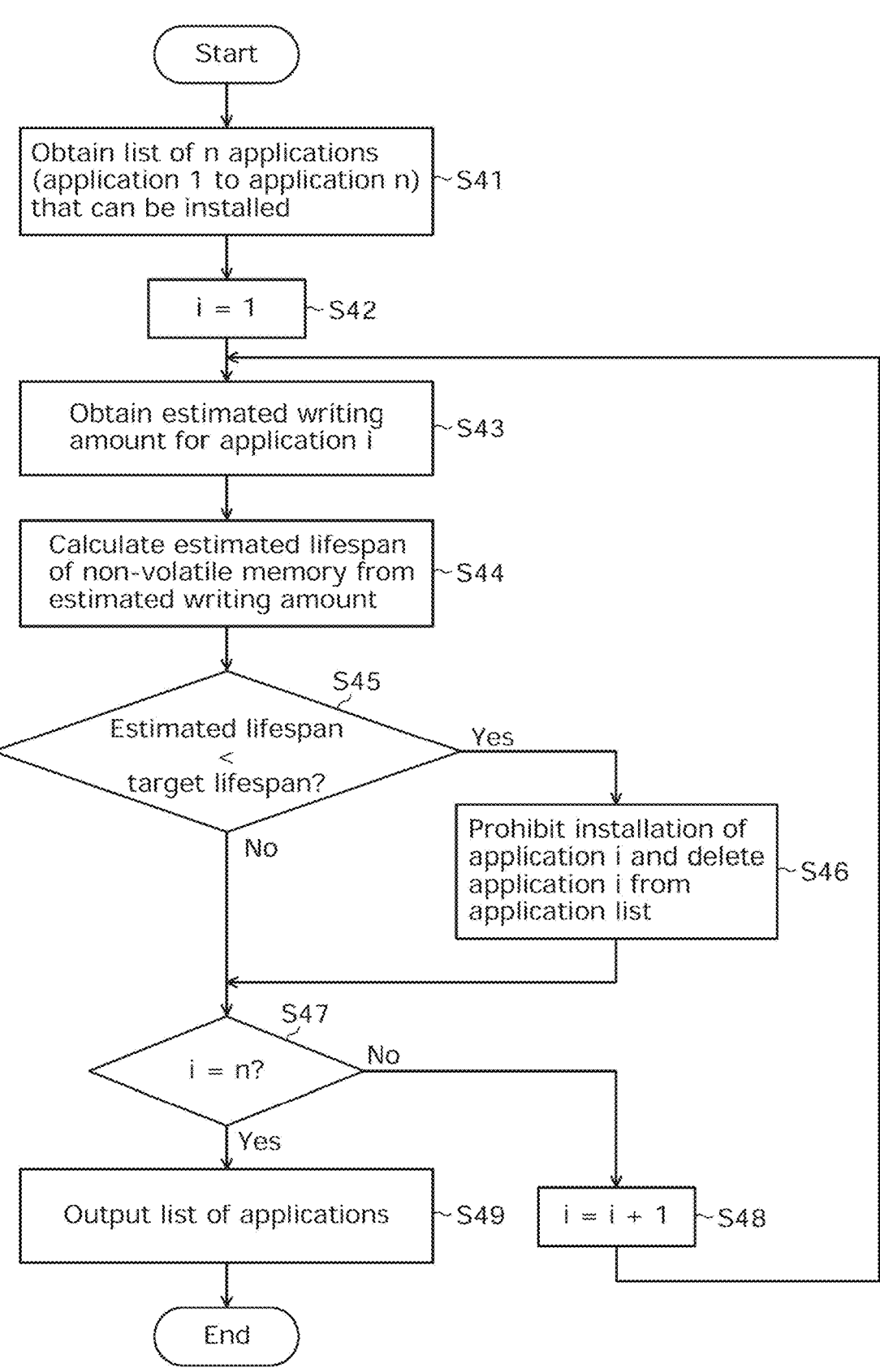
FIG. 8 is a flowchart showing a second operation example in the second information processing method.

FIG. 8 is a flowchart showing a second operation example in the second information processing method. The second operation example in the second information processing method will be described with reference to FIG. 8.

As shown in FIG. 8, application adder 14 obtains a list of n applications (applications 1 to application n) that can be installed (step S41). For example, a server or the like that provides the applications holds this list, and monitor 17 obtains this list from the server or the like that provides the applications.

Application adder 14 sets i=1 (step S42), and obtains the estimated writing amount of application i (obtaining step) (step S43). For example, monitor 17 obtains the estimated writing amount from a server or the like that provides application i.

Application adder 14 calculates the estimated lifespan of non-volatile memory 20 from the estimated writing amount of application i (step S44).

Application adder 14 determines whether the estimated lifespan is shorter than the target lifespan (step S45).

If the estimated lifespan is shorter than the target lifespan (Yes in step S45), application adder 14 prohibits the installation of application i and deletes application i from the list of applications (suppressing step) (step S46).

If the estimated lifespan is not shorter than the target lifespan (No in step S45), application adder 14 determines whether i=n (step S47).

If i=n is not true (No in step S47), application adder 14 sets i=i+1 (step S48) and obtains the estimated writing amount of application i from the list of applications (obtaining step) (step S43).

If i=n is true (Yes in step S47), displayer 12 outputs the list of applications (step S49). In this way, displayer 12 outputs a list of one or more applications the installation of which is not prohibited among a plurality of applications. This allows a user or the like to select an application to be installed in information processing system 10 from among the one or more applications the installation of which is not prohibited.

It should be noted that information processing system 10 may perform only one of the first operation example shown in FIG. 7 and the second operation example shown in FIG. 8, or may perform whichever one is selected by a user or the like.

Figure 9:
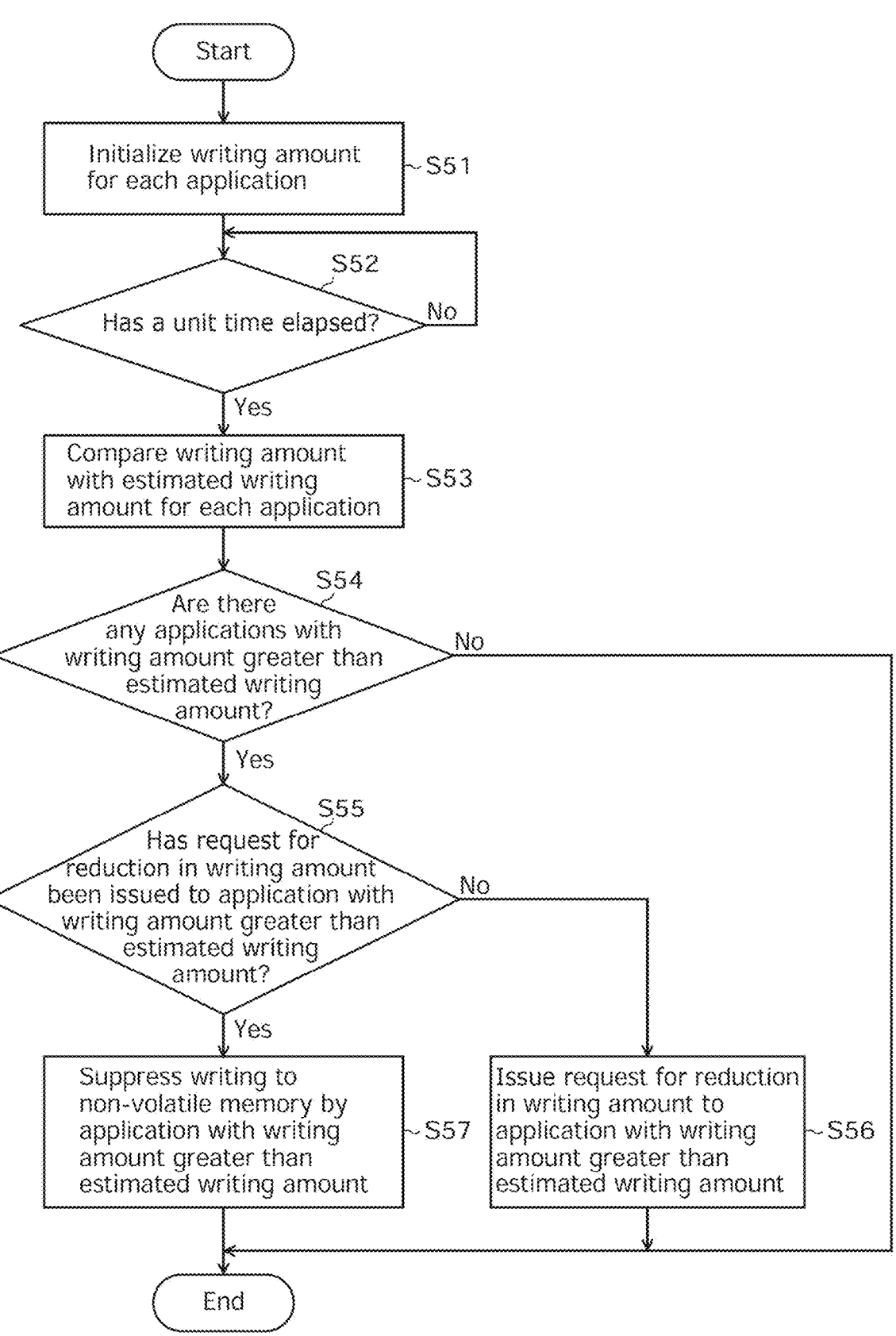
FIG. 9 is a flowchart showing a third operation example in the second information processing method.

FIG. 9 is a flowchart showing a third operation example in the second information processing method. The third operation example in the second information processing method will be described with reference to FIG. 9.

As shown in FIG. 9, monitor 17 initializes the writing amount for each application (step S51).

Monitor 17 determines whether a unit time has elapsed (step S52).

If the unit time has not elapsed (No in step S52), monitor 17 again determines whether the unit time has elapsed (step S52).

When a unit time has elapsed (Yes in step S52), monitor 17 compares the writing amount with the estimated writing amount for each application (step S53). For example, when writing is performed a plurality of times within a unit time, monitor 17 sums up the writing amounts for the plurality of times and compares the summed writing amount with the estimated writing amount.

Monitor 17 determines whether there are any applications with the writing amount greater than the estimated writing amount (step S54).

If there is no application with the writing amount greater than the estimated writing amount (No in step S54), monitor 17 terminates the processing.

If there is an application with the writing amount greater than the estimated writing amount (Yes in step S54), monitor 17 determines whether a request for a reduction in the writing amount has been issued to the application with the writing amount greater than the estimated writing amount (step S55).

If monitor 17 has not yet issued, to the application with the writing amount greater than the estimated writing amount, a request for a reduction in the writing amount (No in step S55), it issues, to the application with the writing amount greater than the estimated writing amount, a request for a reduction in the writing amount (step S56).

If monitor 17 has already issued, to the application with the writing amount greater than the estimated writing amount, a request for a reduction in the writing amount (Yes in step S55), it suppresses writing to non-volatile memory 20 by the application with the writing amount greater than the estimated writing amount (step S57).

For example, information processing system 10 performs the third operation example shown in FIG. 9 every unit time.

Figure 10:
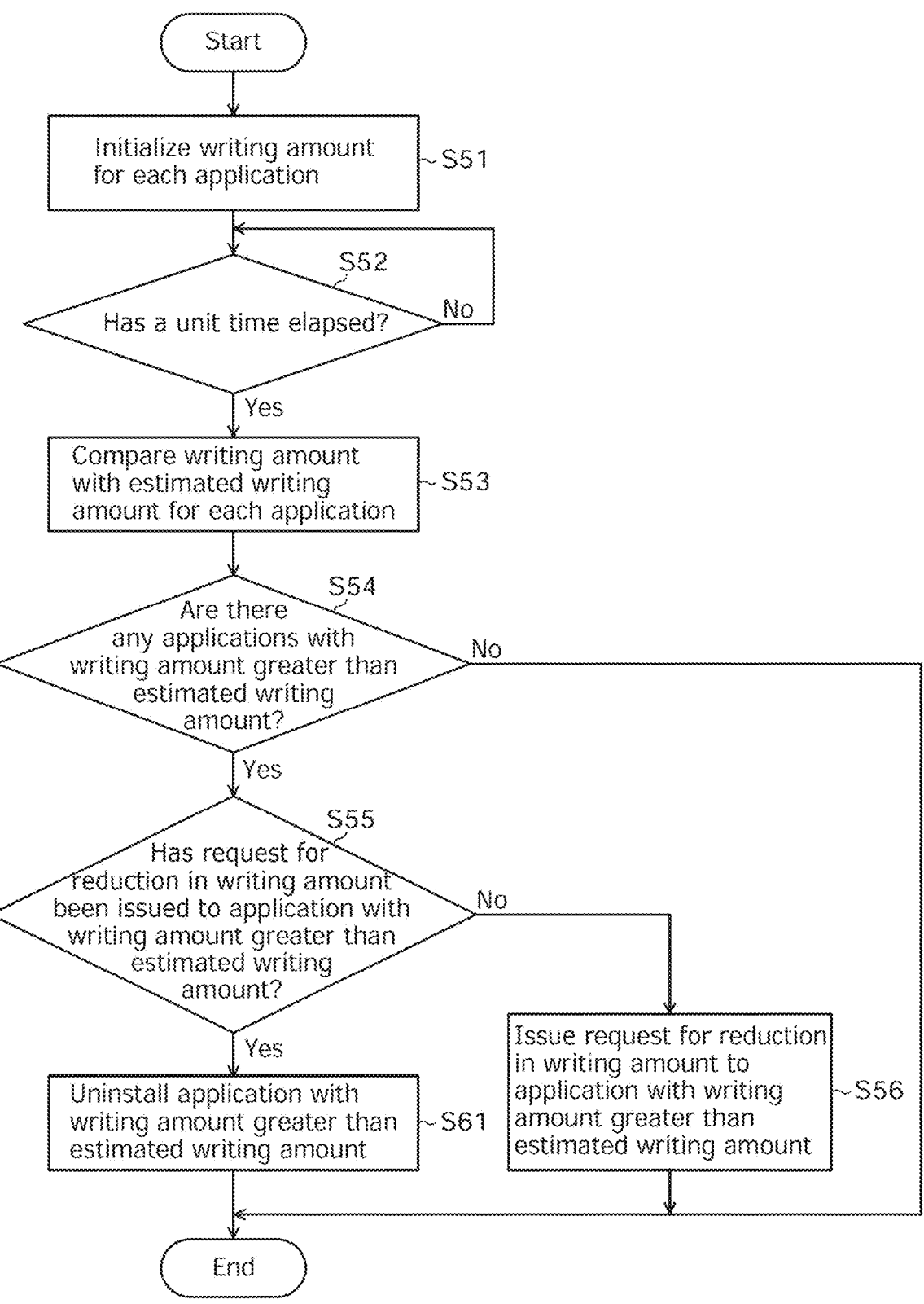
FIG. 10 is a flowchart showing a fourth operation example in the second information processing method.

FIG. 10 is a flow chart showing a fourth operation example in the second information processing method. The fourth operation example in the second information processing method will be described with reference to FIG. 10. It should be noted that the following description will focus on the differences from the third operation example shown in FIG. 9.

If monitor 17 has already issued, to an application with the writing amount greater than the estimated writing amount, a request for a reduction in the writing amount (Yes in step S55), it uninstalls the application with the writing amount greater than the estimated writing amount (step S61).

For example, information processing system 10 performs the fourth operation example shown in FIG. 10 every unit time.

It should be noted that information processing system 10 may perform only one of the third operation example shown in FIG. 9 and the fourth operation example shown in FIG. 10, or may perform whichever one is selected by a user or the like.

Information processing system 10 according to the present embodiment includes: application adder 14 that obtain an estimated writing amount that is estimated to be written to a non-volatile memory by an application per unit time; and application adder 14, monitor 17, and controller 18 that suppress writing to non-volatile memory 20 by the application based on the estimated writing amount.

According to this, it is possible to suppress writing to non-volatile memory 20 by an application based on the estimated writing amount, so that the shortened lifespan of non-volatile memory 20 can be suppressed.

In addition, in information processing system 10 according to the present embodiment, application adder 14 obtains the estimated writing amount when the application is installed in information processing system 10.

According to this, when an application is installed in information processing system 10, the estimated writing amount can be reliably obtained, and writing to non-volatile memory 20 by the application based on the estimated writing amount can be reliably suppressed, so that the shortened lifespan of non-volatile memory 20 can be suppressed.

In addition, in information processing system 10 according to the present embodiment, monitor 17 and controller 18 suppress writing when the writing amount that is the amount of data written per unit time to non-volatile memory 20 by the application is greater than the estimated writing amount.

According to this, it is possible to suppress the shortened lifespan of non-volatile memory 20 when the writing amount is greater than the estimated writing amount.

In addition, in information processing system 10 according to the present embodiment, monitor 17 and controller 18 suppress writing by prohibiting writing.

According to this, it is possible to prohibit the application from writing to non-volatile memory 20, so that the shortened lifespan of non-volatile memory 20 can be suppressed more reliably.

In addition, information processing system 10 according to the present embodiment includes displayer 12 that outputs a warning when the writing amount is greater than the estimated writing amount.

According to this, by informing the user or the like that the writing amount is greater than the estimated writing amount, the user is prompted to change the operation of the application to a state in which the writing amount is reduced, and it is possible to suppress the shortened lifespan of non-volatile memory 20.

In addition, information processing system 10 according to the present embodiment includes controller 18 that notifies an application that writing is being suppressed while the writing is being suppressed.

This allows the application to receive a notification and change to a state in which the writing amount is reduced, making it easier to reduce the writing amount to non-volatile memory 20, so that it is possible to suppress the shortened lifespan of non-volatile memory 20 more reliably.

In addition, in information processing system 10 according to the embodiment, application adder 14 calculates an estimated lifespan of non-volatile memory 20 from the estimated writing amount, and if the estimated lifespan is shorter than a target lifespan of non-volatile memory 20, application adder 14 suppresses writing by prohibiting the installation of applications in information processing system 10.

According to this, if the estimated lifespan of non-volatile memory 20 is shorter than the target lifespan, the installation of application in information processing system 10 can be prohibited, so that it is possible to suppress the shortened lifespan of non-volatile memory 20 more reliably.

In addition, information processing system 10 according to the present embodiment includes displayer 12 that outputs a list of one or more applications among the plurality of applications, the installation of which is not prohibited.

According to this, it is possible to inform the user or the like of one or more applications, the installation of which is not prohibited. This makes it possible to suppress complicated installation operations due to a failure to install an application, the installation of which is prohibited.

In addition, in information processing system 10 according to the present embodiment, if the writing amount that is the amount of data written to non-volatile memory 20 per unit time by the installed application is greater than the estimated writing amount, monitor 17 issues, to the installed application, a request for a reduction in the writing amount to non-volatile memory 20.

This allows the application to receive notification and change to a state in which the writing amount is reduced, making it easier to reduce the writing amount to non-volatile memory 20, so that it is possible to further reliably suppress the shortened lifespan of non-volatile memory 20. For example, in the case of an application that records videos and the like, it is possible to reduce the writing amount while minimizing the impact on users or the like by lowering the recording quality of the videos.

In addition, in information processing system 10 according to the present embodiment, monitor 17 and controller 18 suppress writing if the writing amount is greater than the estimated writing amount and the request for the reduction has been issued.

This makes it possible to reliably suppress the shortened lifespan of non-volatile memory 20 even when a request for a reduction in the writing amount has been issued to the application, but the application has not sufficiently reduced the writing amount.

In addition, in information processing system 10 according to the present embodiment, if the writing amount is greater than the estimated writing amount and the request for the reduction has been issued, monitor 17 uninstalls the application from information processing system 10.

This makes it possible to reliably suppress the shortened lifespan of non-volatile memory 20 if the writing amount is greater than the estimated writing amount and the request for the reduction in the writing amount has already been issued. In addition, since uninstallation deletes the application from non-volatile memory 20, the free space in non-volatile memory 20 increases, making it possible to further reliably suppress the shortened lifespan of non-volatile memory 20.

In addition, the information processing method according to the present embodiment includes an obtaining step (step S2, step S32, step S43) for obtaining an estimated writing amount that is estimated to be written to non-volatile memory 20 by an application per unit time, and a suppressing step (step S26, step S37, step S46) for suppressing writing to non-volatile memory 20 by the application based on the estimated writing amount.

This provides the same effects as information processing system 10 described above.

In addition, the program according to the present embodiment is a program for causing a computer to execute the information processing method described above.

This provides the same effects as information processing system 10 described above.

Other Embodiments, Etc

While the information processing system and the like according to one or more aspects has been described above based on the embodiment, the present disclosure is not limited to this embodiment. Forms obtained by applying various modifications to the present embodiment conceived by a person skilled in the art without departing from the spirit of the present disclosure may also be included within the scope of the present disclosure.

In the embodiment mentioned above, the case has been described where the application and the estimated writing amount are obtained from a server that provides the application connected via communication interface 11, but the present disclosure is not limited thereto. For example, when manufacturing information processing system 10, the application and the estimated writing amount may be recorded in recording device 16 before incorporating recording device 16 into information processing system 10. In addition, instead of a server, an external recording medium on which the application and the estimated writing amount are recorded may be connected to the information processing system, and the application and the estimated writing amount may be copied from the external recording medium to recording device 16.

It should be noted that in the embodiment mentioned above, the case has been described where the estimated writing amount is the amount of data estimated to be written to non-volatile memory 20 by an application per unit time, and the writing amount is the amount of data written to non-volatile memory 20 by the application per unit time, but the present disclosure is not limited thereto. For example, the estimated writing amount may be the number of times that an application is estimated to write to non-volatile memory 20 per unit time, and the writing amount may be the number of times that an application has written to non-volatile memory 20 per unit time. In this case, the writable amount may be the number of times that writing to non-volatile memory 20 is possible. In addition, the case has been described where the estimated writing amount is obtained when an application is added, but the present disclosure is not limited thereto. For example, after installation, the writing amount from the application may be obtained for a certain period of time, and the estimated writing amount may be calculated based on the obtained result. Even if the estimated writing amount cannot be obtained when an application is added, it is effective because the shortened lifespan of non-volatile memory 20 can be suppressed by suppressing writing based on the estimated writing amount.

It should be noted that in the embodiment mentioned above, each component may be configured with dedicated hardware, or may be realized by executing a software program suitable for each component. Each component may be realized by a program executer such as a central processing unit (CPU) or a processor reading out and executing a software program recorded on a recording medium such as a hard disk or semiconductor memory. Here, the software that realizes the devices and the like of the embodiment mentioned above is a program that causes a computer to execute each step included in the flowcharts shown in FIG. 3, FIG. 4, FIG. 5, FIG. 7, FIG. 8, FIG. 9, and FIG. 10.

It should be noted that the following cases are also included in the present disclosure.

(1) Specifically, each of the above devices is a computer system including a microprocessor, a ROM, a RAM, a hard disk unit, a displayer, a keyboard, a mouse, and the like. A computer program is stored in the RAM or hard disk unit. Each device achieves its function when the microprocessor operates in accordance with the computer program. Here, a computer program includes a combination of a plurality of instruction codes that indicate commands to a computer to achieve a predetermined function.

(2) Some or all of the components included in each of the above devices may include a single system large scale integration (LSI). A system LSI is an ultra-multifunctional LSI manufactured by integrating a plurality of component units on a single chip, and specifically, is a computer system including a microprocessor, ROM, RAM, and the like. A computer program is stored in the RAM. The system LSI achieves its functions by the microprocessor operating in accordance with the computer program.

(3) Some or all of the components included in each of the above devices may include an IC card or a standalone module that can be attached to and detached from each device. The IC card or the module is a computer system including a microprocessor, a ROM, a RAM, and the like. The IC card or the module may include the ultra-multifunction LSI described above. The IC card or the module achieves its functions by the microprocessor operating in accordance with a computer program. This IC card or this module may be tamper-resistant.

(4) The present disclosure may be the methods as described above. In addition, the present disclosure may also be a computer program for implementing these methods by a computer, or a digital signal included in the computer program.

In addition, the present disclosure may be the computer program or the digital signal recorded on a computer-readable recording medium, such as a flexible disk, a hard disk, a CD-ROM, an MO, a DVD, a DVD-ROM, a DVD-RAM, a BD (Blu-ray (registered trademark) Disc), a semiconductor memory, or the like. In addition, the present disclosure may be the digital signal recorded on such a recording medium.

In addition, the present disclosure may include transmitting the computer program or the digital signal via a telecommunications line, a wireless or wired communication line, a network represented by the Internet, data broadcasting, or the like.

In addition, the present disclosure may provide a computer system including a microprocessor and a memory, in which the memory stores the computer program described above, and the microprocessor operates in accordance with the computer program.

In addition, the program or the digital signal may be implemented by another independent computer system by recording the program or the digital signal on the recording medium and transferring it, or by transferring the program or the digital signal via the network or the like.

(5) The above embodiments and other embodiments may be combined.

Additional Note

The above description of the embodiments and the like discloses the following technologies.

(Technology 1)

An information processing system including:

an obtainer that obtains an estimated writing amount that is an estimated amount of data to be written to a non-volatile memory by an application per unit time, and a suppressor that suppresses writing to the non-volatile memory by the application based on the estimated writing amount.

(Technology 2)

The information processing system according to technology 1, wherein the obtainer obtains the estimated writing amount when the application is installed in the information processing system.

(Technology 3)

The information processing system according to technology 1, wherein when a writing amount that is an amount of data written to the non-volatile memory by the application per unit time is greater than the estimated writing amount, the suppressor suppresses the writing.

(Technology 4)

The information processing system according to technology 3, wherein the suppressor suppresses the writing by prohibiting the writing.

(Technology 5)

The information processing system according to technology 3 or 4, the information processing system including:

an outputter that outputs a warning when the writing amount is greater than the estimated writing amount.

(Technology 6)

The information processing system according to any one of technology 3 to 5, the information processing system including:

a notifier that notifies the application that the writing is being suppressed while the writing is being suppressed.

(Technology 7)

The information processing system according to technology 1, wherein the suppressor calculates an estimated lifespan of the non-volatile memory from the estimated writing amount, and when the estimated lifespan is shorter than a target lifespan of the non-volatile memory, the processor suppresses the writing by prohibiting the application from being installed in the information processing system.

(Technology 8)

The information processing system according to technology 7, the information processing system including:

an outputter that outputs a list of one or more applications that are not prohibited from being installed among the plurality of applications including the application.

(Technology 9)

The information processing system according to technology 7 or 8, wherein when a writing amount that is an amount of data written to the non-volatile memory per unit time by the application installed is greater than the estimated writing amount, the suppressor issues, to the application installed, a request for a reduction in the writing amount to the non-volatile memory.

(Technology 10)

The information processing system according to technology 9, wherein the suppressor suppresses the writing when the writing amount is greater than the estimated writing amount and the request for the reduction has been issued.

(Technology 11)

The information processing system according to technology 9, wherein the suppressor uninstalls the application from the information processing system when the writing amount is greater than the estimated writing amount and the request for the reduction has been issued.

(Technology 12)

An information processing method including:

an obtaining step of obtaining an estimated writing amount that is an estimated amount of data to be written to a non-volatile memory by an application per unit time; and a suppressing step of suppressing writing to the non-volatile memory by the application based on the estimated writing amount.

(Technology 13)

A program for causing a computer to execute the information processing method according to technology 12.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-219340 filed on Dec. 26, 2023.

INDUSTRIAL APPLICABILITY

The present disclosure can be used in systems and the like that monitor writing to non-volatile memory.

The invention claimed is:

1. An information processing system comprising:
a memory; and
a processor connected to the memory,
wherein, using the memory, the processor:
obtains an estimated writing amount that is an estimated amount of data to be written to a non-volatile memory by an application per unit time; and
suppresses writing to the non-volatile memory by the application based on the estimated writing amount.

2. The information processing system according to claim 1, wherein the processor obtains the estimated writing amount when the application is installed in the information processing system.

3. The information processing system according to claim 1, wherein when a writing amount that is an amount of data written to the non-volatile memory by the application per unit time is greater than the estimated writing amount, the processor suppresses the writing.

4. The information processing system according to claim 3, wherein the processor suppresses the writing by prohibiting the writing.

5. The information processing system according to claim 3, wherein the processor outputs a warning when the writing amount is greater than the estimated writing amount.

6. The information processing system according to claim 3, wherein the processor notifies the application that the writing is being suppressed while the writing is being suppressed.

7. The information processing system according to claim 1, wherein the processor calculates an estimated lifespan of the non-volatile memory from the estimated writing amount, and when the estimated lifespan is shorter than a target lifespan of the non-volatile memory, the processor suppresses the writing by prohibiting the application from being installed in the information processing system.

8. The information processing system according to claim 7, wherein the processor outputs a list of one or more applications that are not prohibited from being installed among a plurality of applications including the application.

9. The information processing system according to claim 7, wherein when a writing amount that is an amount of data written to the non-volatile memory per unit time by the application installed is greater than the estimated writing amount, the processor issues, to the application installed, a request for a reduction in the writing amount to the non-volatile memory.

10. The information processing system according to claim 9, wherein the processor suppresses the writing when the writing amount is greater than the estimated writing amount and the request for the reduction has been issued.

11. The information processing system according to claim 9, wherein the processor uninstalls the application from the information processing system when the writing amount is greater than the estimated writing amount and the request for the reduction has been issued.

12. An information processing method performed by a computer, the information processing method comprising:
obtaining an estimated writing amount that is an estimated amount of data to be written to a non-volatile memory by an application per unit time; and
suppressing writing to the non-volatile memory by the application based on the estimated writing amount.

* * * * *